(12) United States Patent
Nakada et al.

(10) Patent No.: US 8,963,037 B2
(45) Date of Patent: Feb. 24, 2015

(54) VACUUM CIRCUIT BREAKER

(75) Inventors: Katsushi Nakada, Chiyoda-ku (JP); Masahiro Arioka, Chiyoda-ku (JP)

(73) Assignee: Mitsubishi Electric Corporation, Chiyoda-Ku (JP)

( * ) Notice: Subject to any disclaimer, the term of this patent is extended or adjusted under 35 U.S.C. 154(b) by 377 days.

(21) Appl. No.: 13/510,193

(22) PCT Filed: Aug. 17, 2010

(86) PCT No.: PCT/JP2010/063873
§ 371 (c)(1),
(2), (4) Date: May 16, 2012

(87) PCT Pub. No.: WO2011/118056
PCT Pub. Date: Sep. 29, 2011

(65) Prior Publication Data
US 2012/0228266 A1    Sep. 13, 2012

(30) Foreign Application Priority Data

Mar. 25, 2010    (JP) ................................. 2010-069843

(51) Int. Cl.
*H01H 33/666*    (2006.01)
*H02B 13/035*    (2006.01)
(Continued)

(52) U.S. Cl.
CPC ........... *H02B 13/0354* (2013.01); *H01H 33/42* (2013.01); *H01H 33/6662* (2013.01); *H01H 3/46* (2013.01); *H01H 2033/6667* (2013.01)
USPC .......................................... 218/120; 218/140

(58) Field of Classification Search
CPC ..... H01H 33/66; H01H 33/666; H01H 33/42; H02B 13/02
USPC ......................... 218/2–10, 120, 140, 152–155
See application file for complete search history.

(56) References Cited

U.S. PATENT DOCUMENTS

| | | | |
|---|---|---|---|
| 6,784,392 B1 * | 8/2004 | Piazza et al. | 218/7 |
| 8,110,770 B2 * | 2/2012 | Ichikawa et al. | 218/134 |
| 2010/0288733 A1 | 11/2010 | Ichikawa et al. | |

FOREIGN PATENT DOCUMENTS

| | | |
|---|---|---|
| CN | 1728312 A | 2/2006 |
| JP | 5-083978 U | 11/1993 |

(Continued)

OTHER PUBLICATIONS

Office Action (Patent Examination Report No. 2) issued on Mar. 13, 2014, by the Australian Patent Office in corresponding Australian Patent Application No. 2010349157. (4 pages).

(Continued)

*Primary Examiner* — Amy Cohen Johnson
*Assistant Examiner* — Marina Fishman
(74) *Attorney, Agent, or Firm* — Buchanan Ingersoll & Rooney PC

(57) ABSTRACT

In a vacuum circuit breaker corresponding to three-phase, which is configured by linearly arranging three pressure tanks respectively corresponding to one-phase, in which insulation gas is encapsulated, and a vacuum valve is installed, each pressure tank has a nearly longitudinal shape or a nearly square shape, viewed from a plane surface, and the vacuum valve is arranged in each of the pressure tanks in a state where a drive direction of the movable conductor is aligned with an upper lower direction, and the movable conductor is positioned lower than the vacuum valve, and keeps a sufficient insulation distance with respect to the movable-side connection conductor, and is neared to a position in one of diagonal directions or longitudinal directions of the pressure tank having a nearly square shape or nearly ellipsoidal shape, and moreover, the operation mechanism is arranged and configured at a position, which is lower than the vacuum valve.

14 Claims, 4 Drawing Sheets

(51) Int. Cl.
*H01H 33/42* (2006.01)
*H01H 3/46* (2006.01)

(56) References Cited

FOREIGN PATENT DOCUMENTS

| JP | 09-147698 A | 6/1997 |
| JP | 9-147698 A | 6/1997 |
| JP | 2002-199522 A | 7/2002 |
| JP | 2003-319515 A | 11/2003 |
| JP | 2007-306701 A | 11/2007 |

OTHER PUBLICATIONS

International Search Report (PCT/ISA/210) issued on Sep. 14, 2010, by the Japanese Patent Office as the International Searching Authority for International Application No. PCT/JP2010/063873.

Chinese First Office Action dated Jun. 26, 2014 issued in the corresponding Chinese Patent Application No. 201080064890.2 and English translation (9 pages).

* cited by examiner

VACUUM CIRCUIT BREAKER

TECHNICAL FIELD

The present invention relates to a vacuum circuit breaker used for an electric power transmission-distribution facility, an electric power reception-distribution facility and the like.

BACKGROUND ART

In conventional tank-type vacuum circuit breakers, there is a well-known vacuum circuit breaker that is configured in such a way that a main body of the vacuum circuit breaker is installed in a pressure tank in which an insulation medium, such as SF6 gas or dry air, is encapsulated at about 0.05 to 0.5 MPa·g of gas pressure, and the main body of the vacuum circuit breaker is led to the outside of the pressure tank and connected to a main circuit conductor.

A conventional tank-type vacuum circuit breaker is illustrated in FIG. 6. Two bushings 32 and 33 are individually arranged for each phase on an upper position of a tank 31 having a cylindrical shape, which is arranged in a state where an axis line of the tank is extended in a horizontal direction, and a main body 34 of the vacuum circuit breaker is horizontally arranged in the tank 31. Moreover, a fixed side 35 of the main body 34 of the vacuum circuit breaker is connected to the bushing 32, which is one side of the bushings, and a movable side 36 of the main body 34 is connected to the bushing 33, which is other side of the bushings. Furthermore, the main body 34 of the vacuum circuit breaker is insulated and supported, via supporting insulators, at both end portions in an axis direction of the tank 31. The movable side 36 is led from one end portion of the tank 31 by an insulation rod 37 and connected, via an operation rod 38, to a shaft 39 that can be rotated to a lower side, and moreover, the shaft 39 is configured in such a way that the shaft 39 is linked to an operation mechanism by a three-phase-link bar that is not illustrated (for example, refer to Patent Document 1).

CONVENTIONAL ART DOCUMENT

Patent Document

Patent Document 1: Japanese Laid-Open Patent Publication No. 2003-319515 (Page 2, FIG. 2)

SUMMARY OF THE INVENTION

Problems to be Solved by the Invention

In an electric power transmission-distribution facility and an electric power reception-distribution facility, a vacuum circuit breaker as well as other units is arranged in a limited facility space, so that it is greatly required that an installation area for the vacuum circuit breaker is reduced.

However, in a switching device indicated in Patent Document 1, a main body of a circuit breaker is horizontally arranged in a tank having a cylindrical shape. Moreover, an operation mechanism is installed (mounted) at one end portion in an axis direction of the tank, so that there have been problems in that a size of the device is increased in a horizontal direction, and the installation area for the switching device is increased.

The present invention has been considered (made) to solve above-described problems, and an object of the invention is to provide a vacuum circuit breaker by which the installation area can be reduced while insulation performance in a tank is maintained.

Means for Solving Problems

A vacuum circuit breaker of the present invention includes a vacuum valve in which a fixed electrode and a movable electrode are faced and arranged in a vacuum case, whereby a fixed conductor is led from the fixed electrode, and a movable conductor is led from the movable electrode; pressure tanks corresponding to three-phase, which are configured by linearly arranging three pressure tanks respectively corresponding to one-phase, in which insulation gas is encapsulated, and the vacuum valve is installed; a pair of bushings mounted on an upper portion of each of the pressure tanks; a fixed-side connection conductor for connecting the fixed conductor and a central conductor of the bushing that is one of the pair of bushings; a movable-side connection conductor for connecting the movable conductor and a central conductor of the other bushing; and an operation mechanism for driving the movable conductor; wherein the vacuum valve is arranged in each of the pressure tanks in a state where a drive direction of the movable conductor is aligned with an upper-lower direction, and the movable conductor is positioned lower than the vacuum valve, and moreover, the movable-side connection conductor is arranged in each of the pressure tanks in a state where a longitudinal direction of the movable-side connection conductor is aligned with an upper-lower direction.

Moreover, each of the pressure tanks is formed with a nearly ellipsoidal shape viewed from a plane surface and arranged in a state where a longitudinal direction of each of the pressure tanks is inclined in the same direction, viewed from a plane surface, with respect to an arrangement direction of each of the pressure tanks, and the vacuum valve is arranged in each of the pressure tanks in a state where a drive direction of the movable conductor is aligned with an upper-lower direction, and the movable conductor is positioned lower than the vacuum valve.

Effects of the Invention

According to the vacuum circuit breaker of the present invention, the vacuum circuit breaker includes each of pressure tanks corresponding to three-phase, which are configured by linearly arranging three pressure tanks, and the vacuum valve is arranged in each of the pressure tanks in a state where a drive direction of the movable conductor is aligned with an upper-lower direction, and the movable conductor is positioned lower than the vacuum valve, and moreover, the movable-side connection conductor is arranged in each of the pressure tanks in a state where a longitudinal direction of the movable-side connection conductor is aligned with an upper-lower direction, so that a size of the pressure tank in a width direction can be reduced while insulation performance of units in the pressure tank is maintained, whereby an installation area of the vacuum circuit breaker can be reduced.

Moreover, each of the pressure tanks corresponding to three-phase, which are configured by linearly arranging three pressure tanks, is formed with a nearly square shape viewed from a plane surface and arranged in a state where a longitudinal direction of each of the pressure tanks is inclined in the same direction, viewed from a plane surface, with respect to an arrangement direction of each of the pressure tanks, and the vacuum valve is arranged in each of the pressure tanks in a state where a drive direction of the movable conductor is aligned with an upper-lower direction, and the movable conductor is positioned lower than the vacuum valve, so that effects are added to the above-described effect, in which a strength of the pressure tank can be more increased, and durability of the pressure tank can be increased.

MODE FOR CARRYING OUT THE INVENTION

Embodiment 1

Figure 1:
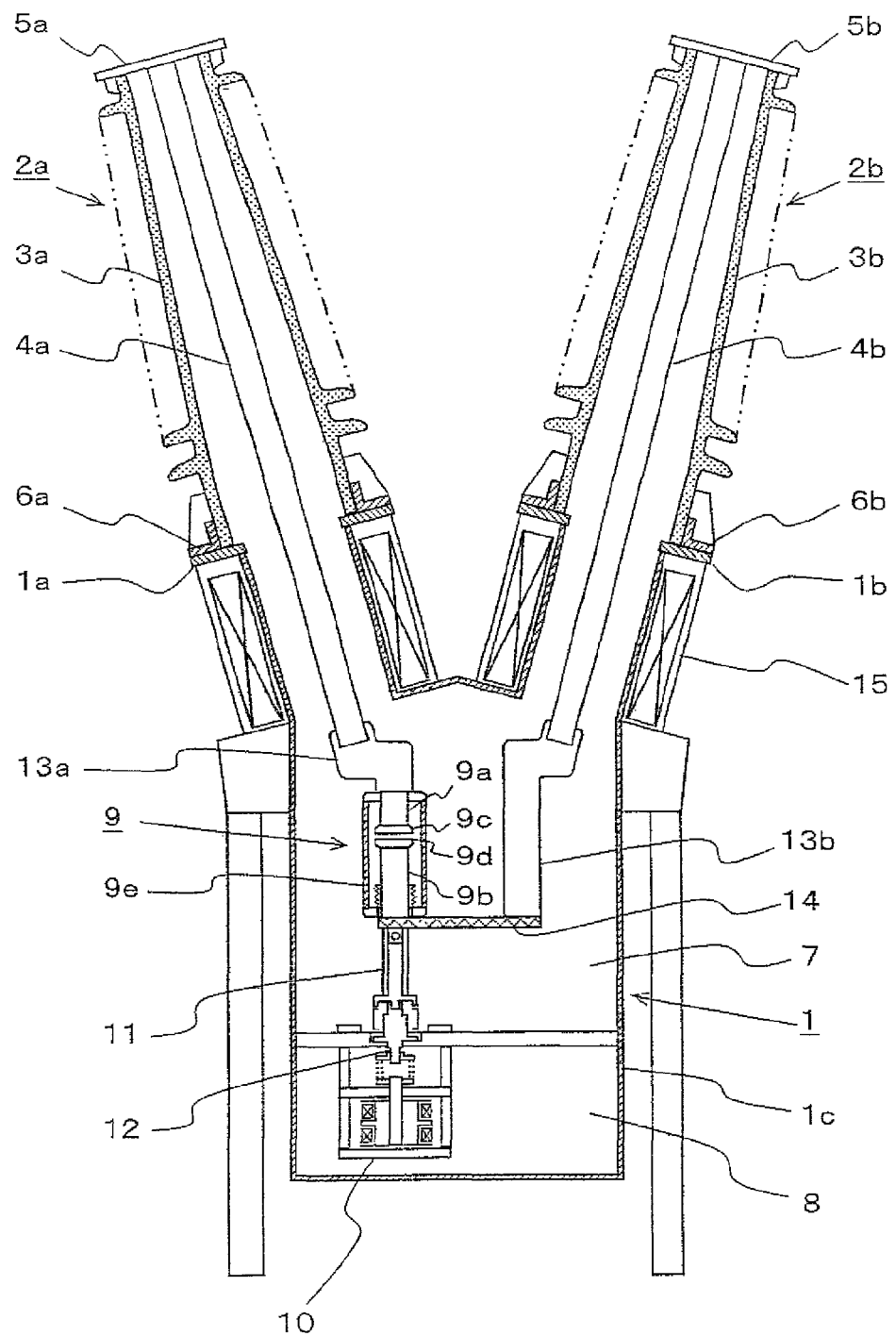
FIG. 1 is a vertical cross-sectional view illustrating a vacuum circuit breaker according to Embodiment 1 of the present invention.
Figure 2:
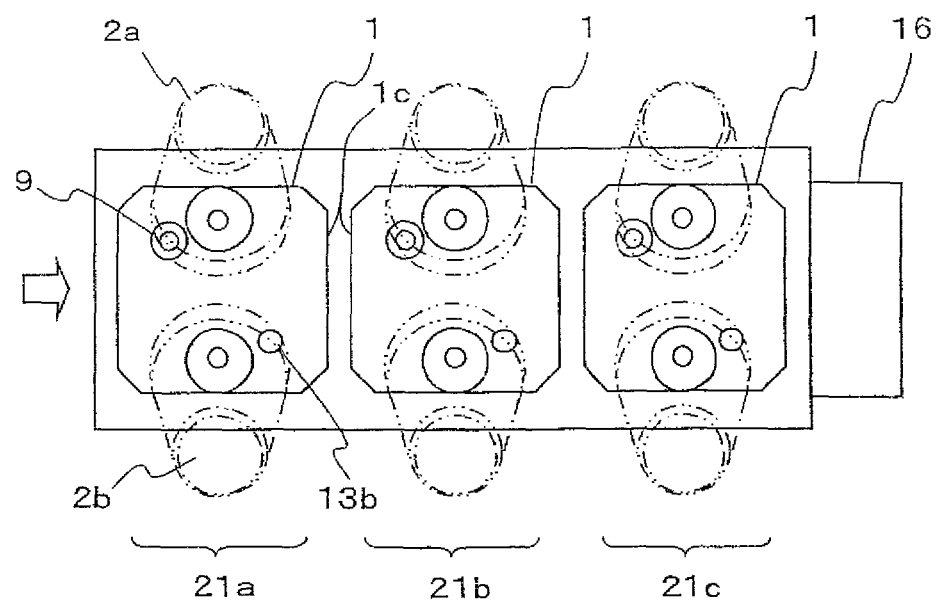
FIG. 2 is a plane cross-sectional view illustrating an overall configuration and a configuration arrangement of main circuit units, which are housed in a pressure tank, of a vacuum circuit breaker according to Embodiment 1 of the present invention.

FIG. 1 is a vertical cross-sectional view illustrating a vacuum circuit breaker according to Embodiment 1 of the present invention, and FIG. 2 is a cross-sectional view, which is viewed from an upper surface direction, for illustrating an overall configuration and a configuration arrangement of main circuit units, which are housed in a pressure tank, of the vacuum circuit breaker illustrated in FIG. 1. In addition, bushings are illustrated by a two-dot chain line, and internal units are simply illustrated so as to indicate necessary portions. FIG. 1 is the cross-sectional view that is viewed from a thick arrow direction in FIG. 2. Hereinafter, the vacuum circuit breaker according to Embodiment 1 will be explained in reference to FIG. 1 and FIG. 2.

Firstly, units corresponding to one-phase in the vacuum circuit breaker will be explained in reference to the vertical cross-sectional view in FIG. 1. A pressure tank 1, which is electrically grounded, has a nearly square shape when the pressure tank 1 is viewed from an upper direction as described below, and it is mounted in a state where four side walls 1c are vertically set. A pair of apertures is formed at an upper position of the pressure tank 1, and flanges 1a and 1b are provided at the apertures, and moreover, bushings 2a and 2b are mounted on each of the flanges 1a and 1b. The bushings 2a and 2b include insulation tubes 3a and 3b, central conductors 4a and 4b which are arranged along center axes of the insulation tubes, terminal conductors 5a and 5b which are hermetically fixed to upper end sides of the insulation tubes 3a and 3b so as to hold the central conductors 4a and 4b, and insulation tube attaching portions 6a and 6b which are fixed to lower end sides of the insulation tubes 3a and 3b. The insulation tube attaching portions 6a and 6b are hermetically fixed to the flanges 1a and 1b of the pressure tank 1 by clam bolts or the like, whereby the insides of both insulation tubes and the inside of the pressure tank are hermetically sustained, and insulation gas can be encapsulated in the insides.

The inside of the pressure tank 1 is partitioned into a circuit breaker room 7, in which main circuit units including a vacuum valve 9 are housed, and an operation mechanism room 8, in which an operation mechanism 10 is housed, and both rooms are configured so as to be hermetically sustained. Although insulation gas is encapsulated in the circuit breaker room 7 at a predefined pressure, the operation mechanism room 8 may be sustained at atmospheric pressures. In addition, the vacuum circuit breaker may be configured in such a way that both the rooms are completely partitioned, and the circuit breaker room 7 in FIG. 1 may be configured as a pressure tank, and the operation mechanism room 8 may be configured as a separate room at the outside of the pressure tank. Hereinafter, the component, which includes the circuit breaker room 7 and the operation mechanism room 8 as illustrated in FIG. 1, will be explained as a pressure tank.

The vacuum valve 9, in which a main contact for keeping a predefined insulation distance with respect to the side walls 1c and for breaking a current is installed, is arranged in the circuit breaker room 7 of the pressure tank 1. In the vacuum valve 9, a fixed conductor 9a, which includes a fixed electrode 9c at a tip of the fixed conductor 9a, and a movable conductor 9b, which includes a movable electrode 9d at a tip of the movable conductor 9b, are installed in a vacuum case 9e in a state where both conductors are facing each other. Each of end portions of the fixed conductors 9a and 9b is led to the outside of the vacuum case 9e, and the movable conductor 9b is driven in an axis direction of the vacuum valve 9, whereby the both electrodes 9c and 9d are contacted or separated. The vacuum valve 9 is arranged in a state where an axis direction is aligned with an upper-lower direction (vertical direction). In other words, the vacuum valve 9 is arranged in a state where a drive direction of the movable conductor 9b is aligned with the upper-lower direction, the movable conductor 9b is positioned at the lower side.

The operation mechanism 10 for driving the movable conductor 9b is arranged at a position along the axis, which is further lower than a position of the movable conductor 9b that is led from the lower side of the vacuum valve 9. The movable conductor 9b is linked to the operation mechanism 10 via an insulation rod 11 and an operation rod 12. In addition, although an example of a system for the operation mechanism 10, which is driven by an electromagnetic force of an electromagnetic coil, is indicated in FIG. 1, the system is not limited to this example, and another system may be used.

The fixed conductor 9a of the vacuum valve 9 is connected to a fixed-side connection conductor 13a that is arranged so as to be keeping a predefined insulation distance with respect to the side walls 1c. An insertion member having a concave shape is provided at an upper side of the fixed-side connection conductor 13a, and a lower end portion of the central conductor 4a of the bushing 2a, which is one side of the bushings, is inserted to the insertion member so as to be electrically connected.

On the other hand, the movable conductor 9b of the vacuum valve 9 is connected, via a flexible conductor 14, to a movable-side connection conductor 13b that is arranged in a vertical direction so as to be keeping a predefined insulation distance with respect to the side walls 1c. Other insertion member having a concave shape is also provided at an upper side of the movable-side connection conductor 13b, and a lower end portion of the central conductor 4b of the bushing 2b, which is other side of the bushings, is inserted to the other insertion member so as to be electrically connected. A current transformer 15 for measuring a current is provided at a lower side of the both bushings 2a and 2b.

In addition, only components required for the present invention are illustrated in FIG. 1, and illustration and explanation of other units, supporting components and the like are omitted.

In the vacuum circuit breaker that is configured as described above, a current pathway of a main circuit is formed, in which the terminal conductor 5a of the bushing 2a, which is one side of the bushings, the central conductor 4a, the fixed-side connection conductor 13a, the vacuum valve 9, the flexible conductor 14, the movable-side connection conductor 13b, the central conductor 4b of the bushing 2b, which is other side of the bushings, and the terminal conductor 5b are sequentially linked. Thus, the operation mechanism 10 is driven by a drive command from an operation panel that is described later, and both electrodes 9c and 9d are contacted or separated, whereby the main circuit is connected or broken.

Secondary, a whole arrangement of units corresponding to three-phase will be explained in reference to the plane cross-sectional view in FIG. 2. In FIG. 2, vacuum circuit breakers 21a, 21b, and 21c respectively corresponding to single-phase, in which main circuit units corresponding to one-phase are installed, which are respectively composed of the pressure tank 1 having a nearly square shape viewed from an upper direction, are arranged in line in a state where the side walls 1c of the neighboring pressure tanks 1 are faced each other. Moreover, an operation panel 16 for totally controlling the vacuum circuit breakers 21a, 21b, and 21c respectively corresponding to single-phase is arranged at the outside of one end portion in an arrangement direction. The vacuum valve 9 installed in each pressure tank 1 is arranged at a position where the vacuum valve 9 is neared to a position in any one of diagonal directions from a center of a diagonal line of the pressure tank 1 having a nearly square shape, and moreover, the center of the vacuum valve 9 is separated nearly same distance from side walls of the pressure tank 1, which are positioned near the vacuum valve 9, and keeps a predefined insulation distance with respect to the side walls of the pressure tank 1.

On the other hand, the movable-side connection conductor 13b is arranged at a position where it is neared to a position in the other diagonal direction—a position in the opposite diagonal direction with respect to the vacuum valve 9—, and keeps a sufficient insulation distance with respect to the vacuum valve 9 and the side walls 1c of the pressure tank 1. (In addition, both units are arranged at positions in the diagonal directions, and it is not required that the units are arranged at positions along the diagonal line.)

Moreover, a pair of bushings 2a and 2b respectively corresponding to each phase are arranged at positions above opposite sides being orthogonal with respect to an arrangement direction of the pressure tank 1.

Hereinafter, the action of the vacuum circuit breaker configured as described above will be explained.

Because the vacuum valve 9 is arranged in the pressure tank 1 in such a way that the drive direction of the movable conductor 9b is aligned with the upper-lower direction, a width of the pressure tank 1 can be reduced, and a width of the vacuum circuit breaker, which is viewed from an arrangement direction (thick arrow direction in FIG. 2) of the pressure tank 1, can be reduced. Moreover, the vacuum valve 9 and the movable-side connection conductor 13b are respectively neared to each of both sides in a diagonal direction of the pressure tank 1 having a nearly square shape viewed from a plane surface of the pressure tank 1, and arranged in a state where those keep a predefined insulation distance each other, whereby the width of the pressure tank 1 in the above-described direction can be more reduced. Furthermore, the operation mechanism 10 is arranged at a lower position of the vacuum valve 9, and the movable conductor 9b can be driven in an upper/lower direction, so that the operation mechanism is not jutted out from the side wall of the pressure tank 1, and moreover, an installation area for the vacuum circuit breaker can be reduced.

In addition, because the vacuum valve 9 and the movable-side connection conductor 13b are arranged in a diagonal direction of the pressure tank 1, a width of the pressure tank 1 in an interphase direction is increased. However, a size in the interphase direction is determined in accordance with an interphase-aerial-insulation distance, so that the whole arrangement area is rarely increased in the arrangement direction of the pressure tank 1, because the vacuum valve 9 and the movable-side connection conductor 13b are arranged in a diagonal direction of the pressure tank 1.

As described above, the vacuum circuit breaker according to Embodiment 1 includes a vacuum valve in which a fixed electrode and a movable electrode are faced and arranged in a vacuum case, whereby a fixed conductor is led from the fixed electrode, and a movable conductor is led from the movable electrode; pressure tanks corresponding to three-phase, which are configured by linearly arranging three pressure tanks respectively corresponding to one-phase, in which insulation gas is encapsulated, and the vacuum valve is installed; a pair of bushings mounted on an upper portion of each of the pressure tanks; a fixed-side connection conductor for connecting the fixed conductor and a central conductor of one of the pair of bushings; a movable-side connection conductor for connecting the movable conductor and a central conductor of the other bushing; and an operation mechanism for driving the movable conductor; wherein each of the pressure tanks is formed with a nearly square shape viewed from a plane surface and arranged in a state where side surfaces of the neighboring pressure tanks are faced, and the vacuum valve is arranged in each of the pressure tanks in a state where a drive direction of the movable conductor is aligned with an upper-lower direction, and the movable conductor is positioned lower than the vacuum valve, so that a size of the pressure tank, viewed from an arrangement direction, in a width direction can be reduced while insulation performance of units in the pressure tank is maintained, whereby an installation area of the vacuum circuit breaker can be reduced.

Moreover, the vacuum valve is neared to a position in one of diagonal directions of the pressure tank having a nearly square shape and arranged in such a way that a center position of the vacuum valve is separated nearly same distance from side walls of the pressure tank, which are positioned near the vacuum valve, and the movable-side connection conductor is neared to a position in the other diagonal direction and arranged, so that the size of the pressure tank in the width direction can be more reduced, whereby the installation area of the vacuum circuit breaker can be more reduced.

Furthermore, the operation mechanism is configured in such a way that the operation mechanism is arranged at a lower position of the vacuum valve and linked to the movable conductor of the vacuum valve via an insulation rod, and the movable conductor is driven in an upper/lower direction by a driving force of the operation mechanism, so that the operation mechanism is not jutted from an outside surface, whereby the installation area of the vacuum circuit breaker can be reduced.

Embodiment 2

Figure 3:
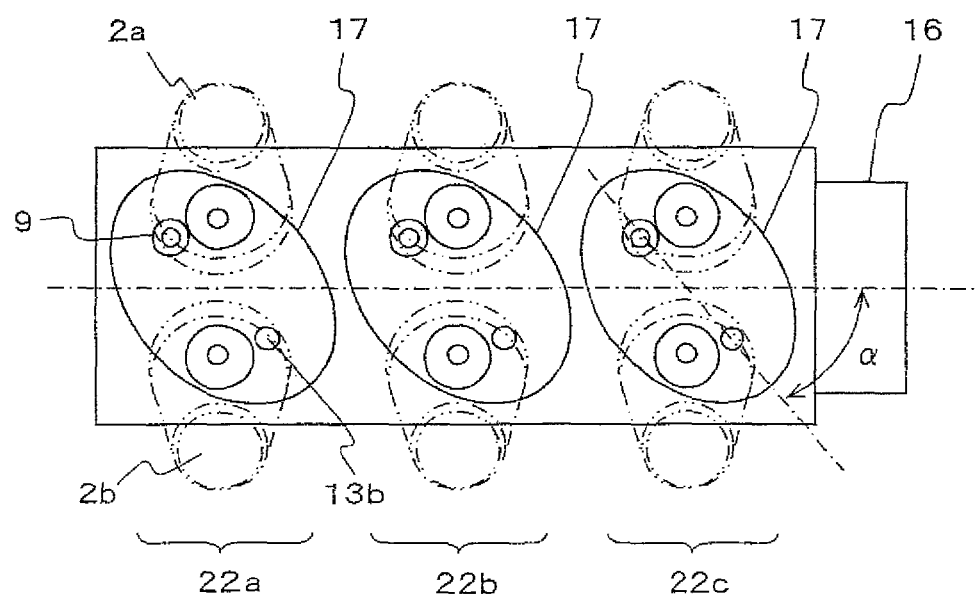
FIG. 3 is a plane cross-sectional view illustrating an overall configuration and a configuration arrangement of main circuit units, which are housed in a pressure tank, of a vacuum circuit breaker according to Embodiment 2 of the present invention.

FIG. 3 is a cross-sectional view, which is viewed from an upper surface direction, for illustrating an overall configuration and a configuration arrangement of main circuit units, which are housed in a pressure tank, of a vacuum circuit breaker according to Embodiment 2 of the present invention. FIG. 3 corresponds to FIG. 2 according to Embodiment 1, and the same symbols as those in FIG. 2 refer to equivalent parts. A vertical cross-sectional view of the vacuum circuit breaker according to Embodiment 2 is equivalent to FIG. 1 according to Embodiment 1, so that an illustration and an explanation for the vertical cross-sectional view are omitted. Hereinafter, a difference between Embodiment 1 and Embodiment 2 will be mainly explained.

As illustrated in FIG. 3, a shape of the pressure tank according to Embodiment 2 is greatly different from a shape of the pressure tank according to Embodiment 1. A pressure tank 17 corresponding to one-phase, which is viewed from a plane surface, has a nearly ellipsoidal shape. In FIG. 3, vacuum circuit breakers 22a, 22b, and 22c respectively corresponding to single-phase, in which main circuit units corresponding to single-phase are respectively installed, which are respectively composed of the pressure tank 17 having a nearly square shape viewed from an upper direction, are arranged in line, whereby vacuum circuit breakers corresponding to three-phase are configured. In this case, the vacuum circuit breakers are arranged in a state where a longitudinal direction of each pressure tank 17 is inclined same angle in the same direction with respect to an arrangement-direction axis of each pressure tank 17. An inclination of the pressure tank 17 is indicated as an inclination angle "α" in FIG. 3. The inclination angle α may be determined so as to reduce a cross-sectional area of the pressure tank 17 having an ellipsoidal shape by considering arrangement relations and insulation distances between devices which are a vacuum valve 9, a movable-side connection conductor 13b, bushings 2a and 2b and the like. Moreover, the bushings 2a and 2b are parallel arranged in an orthogonal direction with respect to the axis in the arrangement-direction, and the bushings 2a and 2b are inclined and attached to the pressure tank 17 in such a way that upper portions of the bushings can be opened toward the outside.

The vacuum valve 9 installed in each pressure tank 17 is arranged at a position where the center of the vacuum valve 9 is neared to a position in one of longitudinal directions of the pressure tank 17 having an ellipsoidal shape, and the vacuum valve 9 keeps a necessary insulation distance with respect to the side walls of the pressure tank 17 and is separated nearly same distance from the side walls of the pressure tank 17, which are positioned near the vacuum valve 9. On the other hand, the movable-side connection conductor 13b is neared to a position in the other longitudinal direction, which is an opposite direction with respect to the vacuum valve 9, and arranged while a necessary insulation distance to the vacuum valve 9 and the side walls is kept. In addition, arrangement positions of the vacuum valve 9 and the movable-side connection conductor 13b, which are neared to each of both sides in the longitudinal direction and arranged, do not represent positions along the longitudinal direction but represent positions in a rough direction.

As described above, in the vacuum circuit breaker according to Embodiment 2, each of the pressure tanks is formed with a nearly ellipsoidal shape viewed from a plane surface and arranged in a state where a longitudinal direction of each of the pressure tanks is inclined in the same direction, viewed from a plane surface, with respect to an arrangement direction of each of the pressure tanks, and the vacuum valve is arranged in each of the pressure tanks in a state where a drive direction of the movable conductor is aligned with an upper-lower direction, and the movable conductor is positioned lower than the vacuum valve, so that a size of the pressure tank, viewed from an arrangement direction, in a width direction can be reduced while insulation performance of units in the pressure tank is maintained, whereby an installation area of the vacuum circuit breaker can be reduced. Moreover, because the pressure tank has an ellipsoidal shape, a strength of the pressure tank according to Embodiment 2 can be more increased than a strength of the pressure tank having a nearly square shape according to Embodiment 1, and durability of the pressure tank can be increased.

Furthermore, the vacuum valve is neared to a position in one of longitudinal directions of the pressure tank having a nearly ellipsoidal shape and arranged in such a way that a center position of the vacuum valve is separated nearly same distance from side walls of the pressure tank, which are positioned near the vacuum valve, and the movable-side connection conductor is neared to a position in the other longitudinal direction and arranged (so as to be arranged), so that the above-described size can be reduced.

Embodiment 3

Figure 4:
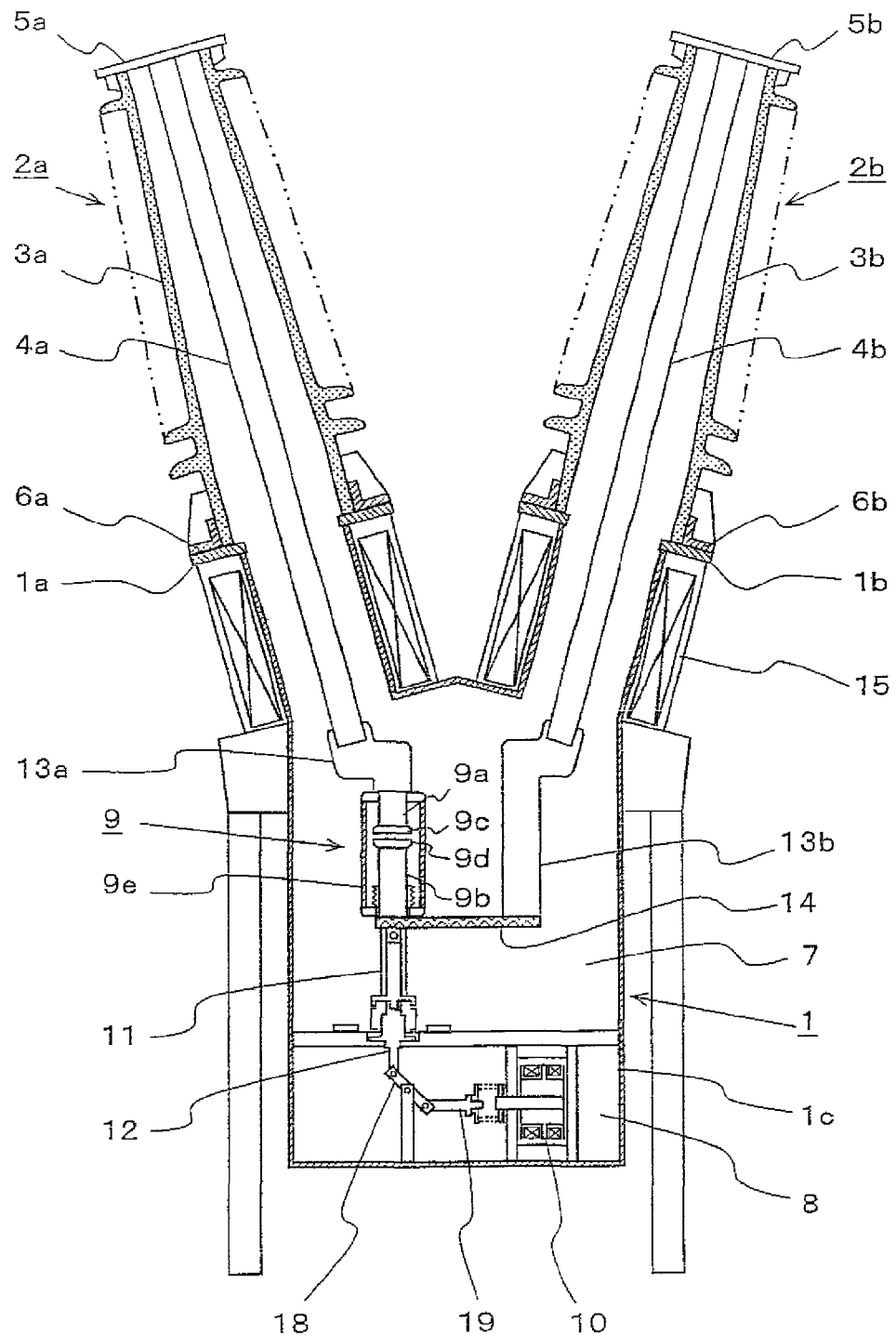
FIG. 4 is a vertical cross-sectional view illustrating a vacuum circuit breaker according to Embodiment 3 of the present invention.

FIG. 4 is a vertical cross-sectional view illustrating a vacuum circuit breaker according to Embodiment 3 of the present invention. FIG. 3 corresponds to FIG. 1 of Embodiment 1, so that the same symbols as those in FIG. 1 refer to equivalent parts, and an explanation for the same symbols is omitted. Hereinafter, differences between Embodiment 1 and Embodiment 3 will be mainly explained. In addition, a plane view of FIG. 3 is equivalent to FIG. 2 according to Embodiment 1 or equivalent to FIG. 3 according to Embodiment 2.

As illustrated in FIG. 4, in Embodiment 3, an operation mechanism 10 is arranged in such a way that an operation-axis direction of the operation mechanism 10 is aligned with a horizontal direction. In other words, the operation mechanism 10 is arranged at a position where the operation mechanism 10 is lower than a vacuum valve 9 and displaced from a position that is directly below the vacuum valve 9, and a conversion lever 18 for converting a drive direction in a 90-degree angle is provided, whereby the drive direction is converted from an upper-lower direction to a horizontal direction. The operation mechanism 10 is linked to a movable conductor 9b of the vacuum valve 9 via an operation shaft 19, the conversion lever 18, an operation rod 12, and an insulation rod 11. The movable conductor 9b of the vacuum valve 9 is driven in an upper/lower direction in accordance with an operation of the operation mechanism 10 which is horizontally arranged. Because the operation mechanism 10 is horizontally arranged, it can be realized that internal space in a lower area of the pressure tank 1 can be more reduced in comparison with the arrangement illustrated in FIG. 1.

Moreover, when the pressure tank 1 is composed within a circuit breaker room 7, and the operation mechanism room 8 is formed as a separate room at outside of the circuit breaker room 7, space under the pressure tank 1 can be reduced.

In addition, the pressure tank 1 may be replaced by the pressure tank 17 having a nearly ellipsoidal shape viewed from a plane surface according to Embodiment 2 of the present invention.

As described above, in the vacuum circuit breaker according to Embodiment 3, the operation mechanism is arranged at a position, which is lower than the vacuum valve and displaced from a directly lower position of the vacuum valve, and linked to the movable conductor of the vacuum valve via an insulation rod and a conversion lever for converting a drive direction in a 90-degree angle, so that an effect of the vacuum circuit breaker according to Embodiment 3 is added to an effect of the vacuum circuit breaker according to Embodiment 1 or Embodiment 2, and space for the vacuum circuit breaker can be reduced by effectively using lower side space in the pressure tank or lower outside space of the pressure tank.

Embodiment 4

Figure 5:
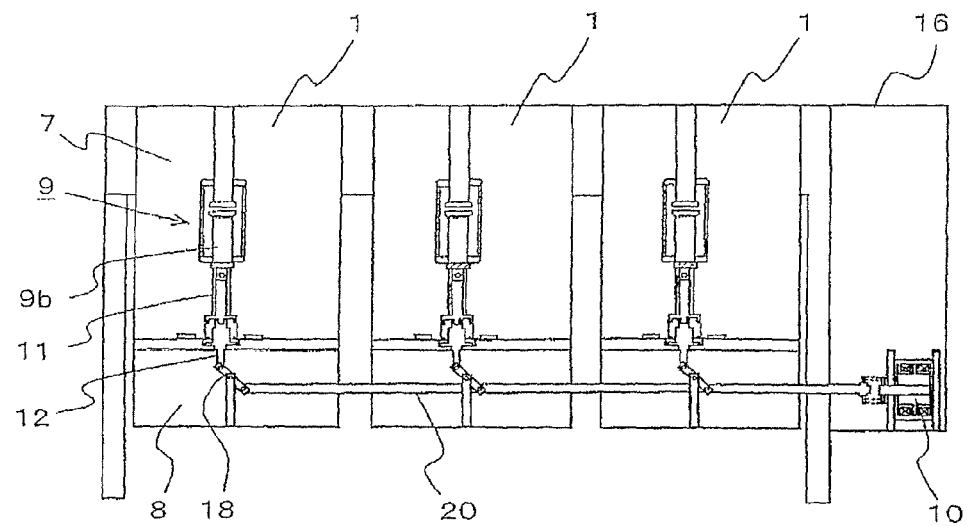
FIG. 5 is a side cross-sectional view illustrating an operation mechanism of a vacuum circuit breaker according to Embodiment 4 of the present invention.
Figure 6:
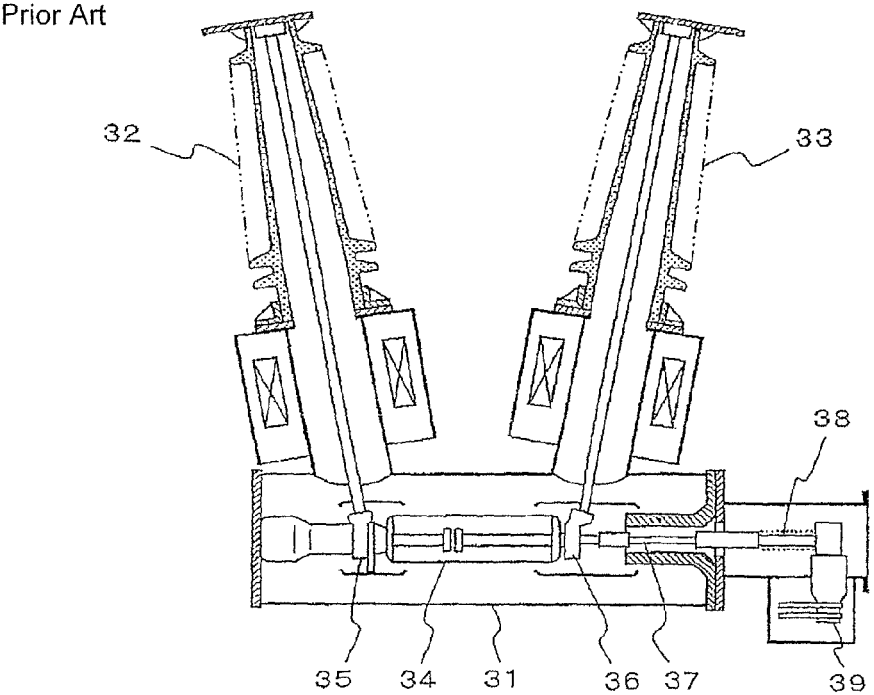
FIG. 6 is a vertical cross-sectional view illustrating conventional gas-insulated switchgear.

FIG. 5 is a side cross-sectional view illustrating a vacuum circuit breaker according to Embodiment 4 of the present invention, which is viewed from an orthogonal direction with respect to an arrangement direction of a pressure tank. However, bushings are omitted in FIG. 5, and the whole of the vacuum circuit breaker is simply illustrated by omitting components other than necessary components for explaining the vacuum circuit breaker. The same symbols as those in FIG. 4 according to Embodiment 3 refer to equivalent parts, and an explanation for the same symbols is omitted.

As illustrated in FIG. 5, an operation mechanism 10 according to Embodiment 4 is not arranged in each pressure tank 1 corresponding to single-phase, but the operation mechanism 10 is arranged at a lower outside of an arrangement end portion in an arrangement direction of each pressure tank 1. Because an operation panel 16 is arranged at the arrangement end portion, the operation mechanism 10 may be housed in the operation panel 16, or may be housed in a case which is individually provided. A link shaft 20, which is horizontally extended in an arrangement direction of each pressure tank 1, is provided at a lower position of each vacuum valve 9, and a movable conductor 9b of each vacuum valve 9 is connected to a link shaft 20 via an insulation rod 11, an operation rod 12, and a conversion lever 18, whereby an end portion of the link shaft 20 is linked to the operation mechanism 10. The vacuum circuit breaker is configured in such a way that a driving force for driving the link shaft 20 by the operation mechanism 10 is transmitted to the movable conductor 9b of each vacuum valve 9 via the conversion lever 18, and the movable conductor 9b is driven in an upper/lower direction, whereby both electrodes of each vacuum valve 9 are contacted or separated.

In addition, the operation mechanism 10 is not limited to the magnet coil system illustrated in FIG. 5. Moreover, the pressure tank 1 may be replaced by the pressure tank 17 having a nearly ellipsoidal shape viewed from a plane surface according to Embodiment 2 of the present invention. Moreover, although the link shaft 20 is disposed in an operation mechanism room 8 as illustrated in FIG. 5, which is partitioned in the pressure tank 1, a pressure tank section may be used for only a circuit breaker room 7 in the other case, and the link shaft 20 may be disposed at a lower outside of the pressure tank.

As described above, in the vacuum circuit breaker according to Embodiment 4, the operation mechanism is configured in such a way that the operation mechanism is arranged at a lower outside of the pressure tanks, which is positioned in an arrangement end portion, and a link shaft, which is horizontally extending in an arrangement direction of each of the pressure tanks, is provided at a lower position of the vacuum valve, and moreover, an end portion of the link shaft is linked to the operation mechanism, and the movable conductor of the vacuum valve is connected to the link shaft via an insulation rod and a conversion lever, whereby a drive force for driving the link shaft by the operation mechanism is transmitted to the movable conductor of the vacuum valve corresponding to each phase via the conversion lever, and the movable conductor is driven in an upper/lower direction, so that an effect for reducing a size of the pressure tank in a width direction is added, and an open-close operation the vacuum valve corresponding to each phase can be totally controlled by one operation mechanism, whereby the operation mechanism is not needed in each of the pressure tanks.

Moreover, space for the vacuum circuit breaker can be reduced by effectively using lower side space in the pressure tank or lower outside space of the pressure tank.

What is claimed is:

1. A vacuum circuit breaker comprising:
   a vacuum valve in which a fixed electrode and a movable electrode are faced and arranged in a vacuum case, whereby a fixed conductor is led from the fixed electrode, and a movable conductor is led from the movable electrode;
   pressure tanks corresponding to three-phase, which are configured by linearly arranging three pressure tanks respectively corresponding to one-phase, in which insulation gas is encapsulated, and the vacuum valve is installed;
   a pair of bushings mounted on an upper portion of each of the pressure tanks;
   a fixed-side connection conductor for connecting the fixed conductor and a central conductor of the bushing that is one of the pair of bushings;
   a movable-side connection conductor for connecting the movable conductor and a central conductor of the other bushing; and
   an operation mechanism for driving the movable conductor; wherein the vacuum valve is arranged in each of the pressure tanks in a state where a drive direction of the movable conductor is aligned with an upper-lower direction, and the movable conductor is positioned lower than the vacuum valve, and moreover, the movable-side connection conductor is arranged in each of the pressure tanks, in parallel with the vacuum valve, in a state where a longitudinal direction of the movable-side connection conductor is aligned with an upper-lower direction.

2. A vacuum circuit breaker as recited in claim 1, wherein each of the pressure tanks is formed with a nearly longitudinal shape viewed from a plane surface.

3. A vacuum circuit breaker as recited in claim 2, wherein each of the pressure tanks is arranged in a state where a longitudinal direction of each of the pressure tanks is inclined in the same direction with respect to an arrangement direction of each of the pressure tanks.

4. A vacuum circuit breaker as recited in claim 2, wherein the vacuum valve is neared to a position in one of longitudinal directions of each of the pressure tanks having a nearly ellipsoidal shape, and the movable-side connection conductor is neared to a position in the other longitudinal direction and arranged.

5. A vacuum circuit breaker as recited in claim 1, wherein each of the pressure tanks is formed with a nearly square shape viewed from a plane surface and arranged in a state where side surfaces of the neighboring pressure tanks are faced.

6. A vacuum circuit breaker as recited in claim 5, wherein the vacuum valve is neared to a position in one of diagonal directions of each of the pressure tanks having a nearly square shape, and the movable-side connection conductor is neared to a position in the other diagonal direction and arranged.

7. A vacuum circuit breaker as recited in claim 4, wherein the vacuum valve is arranged in such a way that a center position, viewed from an axis direction of the vacuum valve, of the vacuum valve is separated nearly same distance from both side walls of the pressure tanks, which are positioned near the vacuum valve.

8. A vacuum circuit breaker as recited in claim 6, wherein the vacuum valve is arranged in such a way that a center position, viewed from an axis direction of the vacuum valve, of the vacuum valve is separated nearly same distance from both side walls of the pressure tanks, which are positioned near the vacuum valve.

9. A vacuum circuit breaker as recited in claim 1, wherein the operation mechanism is configured in such a way that the operation mechanism is arranged at a lower position of the vacuum valve and linked to the movable conductor of the vacuum valve via an insulation rod, and the movable conductor is driven in an upper/lower direction by a driving force of the operation mechanism.

10. A vacuum circuit breaker as recited in claim 1, wherein the operation mechanism is configured in such a way that the operation mechanism is arranged at a position, which is lower than the vacuum valve and displaced from a directly lower position of the vacuum valve, and linked to the movable conductor of the vacuum valve via an insulation rod and a conversion lever for converting a drive direction in a 90-degree angle, whereby a driving force of the operation mechanism in a horizontal direction is transmitted to the movable conductor via the conversion lever, and the movable conductor is driven in an upper/lower direction.

11. A vacuum circuit breaker as recited in claim 1, wherein the operation mechanism is configured in such a way that the operation mechanism is arranged at a lower outside of the pressure tanks, which is positioned in an arrangement end portion, and a link shaft, which is horizontally extending in an arrangement direction of each of the pressure tanks, is provided at a lower position of the vacuum valve, and moreover, an end portion of the link shaft is linked to the operation mechanism, and the movable conductor of the vacuum valve is connected to the link shaft via an insulation rod and a conversion lever, whereby a drive force for driving the link shaft by the operation mechanism is transmitted to the movable conductor of the vacuum valve corresponding to each phase via the conversion lever, and the movable conductor is driven in an upper/lower direction.

12. A vacuum circuit breaker as recited in claim 1, wherein the movable-side connection conductor is connected to the movable conductor via a flexible conductor.

13. A vacuum circuit breaker as recited in claim 12, wherein the flexible conductor extends from the movable-side connection conductor to the movable conductor in a direction substantially orthogonal to the upper/lower direction.

14. A vacuum circuit breaker as recited in claim 1, wherein the movable-side connection conductor and the vacuum valve are arranged relative to each other such that in plan view as seen from above the vacuum circuit breaker, the pair of bushings oppose each other along an imaginary line extending through a center of each of the bushings, and the movable-side connection conductor and the vacuum valve are on opposite sides of the imaginary line.

* * * * *